United States Patent [19]

McNeil

[11] Patent Number: 4,663,682
[45] Date of Patent: May 5, 1987

[54] APPARATUS FOR LOADING AND UNLOADING A MAGNETIC HEAD ASSEMBLY ON A MAGNETIC RECORDING SURFACE

[75] Inventor: Michael McNeil, Lompoc, Calif.

[73] Assignee: DMA Systems Corporation, Goleta, Calif.

[21] Appl. No.: 556,080

[22] Filed: Nov. 29, 1983

[51] Int. Cl.⁴ .......................... G11B 5/54; G11B 21/22
[52] U.S. Cl. ..................................... 360/105; 360/103
[58] Field of Search ................. 360/102–104, 360/105, 97–99, 128, 130.3, 130.34, 75, 106

[56] References Cited
U.S. PATENT DOCUMENTS

| | | | |
|---|---|---|---|
| 3,713,121 | 1/1973 | Fasano et al. | 360/105 X |
| 3,896,495 | 7/1975 | Beecroft | 360/103 |
| 4,167,765 | 9/1979 | Watrous | 360/104 |
| 4,206,489 | 6/1980 | Manzke et al. | 360/105 |
| 4,302,789 | 11/1981 | Vos | 360/105 |
| 4,376,294 | 3/1983 | Meier et al. | 360/105 |

OTHER PUBLICATIONS

Hall et al., "Head Retraction Latch Mechanism", IBM T.D.B., Nov. 1977, vol. 20, No. 6, pp. 2362-2363.
Wilkinson, Jr., "Retraction Device for Magnetic Transducer Assembly", IBM TDB, Feb. 1973, vol. 15, No. 9, p. 2750.

Primary Examiner—Stuart N. Hecker
Assistant Examiner—David J. Severn
Attorney, Agent, or Firm—Spensley Horn Jubas & Lubitz

[57] ABSTRACT

An apparatus for loading and unloading a magnetic head assembly on a magnetic recording surface which permits separation of function between load/retract and flying and which produces a predictable pitch to the magnetic head assembly in the static condition and no pitch bias in the dynamic flying condition. The present invention improves on the IBM type 3370 by adding to the single piece spring/load beam element a pair of wings which extend laterally on each side thereof and a pair of stationary cam members positioned on opposite sides of the element. The arrangement of the torque wings and cams permits unrestricted retraction of the slider. The placement of the wings results in a favorable ratio of lift point to load beam bending point and more control of load zone accuracy.

4 Claims, 5 Drawing Figures

U.S. Patent  May 5, 1987  Sheet 1 of 2  4,663,682
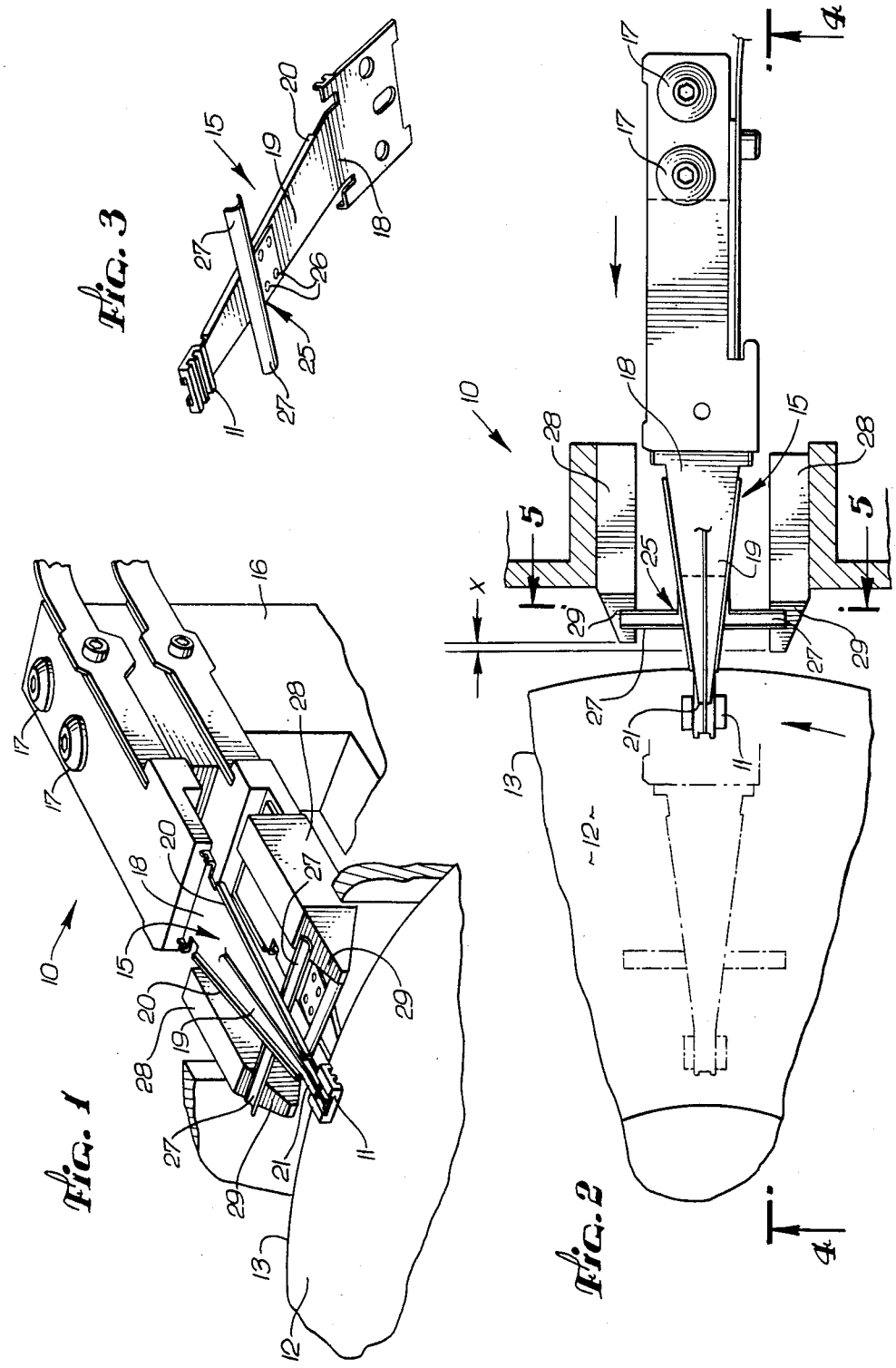

APPARATUS FOR LOADING AND UNLOADING A MAGNETIC HEAD ASSEMBLY ON A MAGNETIC RECORDING SURFACE

BACKGROUND OF THE INVENTION

1. Field of the Invention

The present invention relates to an apparatus for loading and unloading a magnetic head assembly on a magnetic recording surface and, more particularly, to a loading and retraction apparatus which permits separation of function between load retract and flying and which produces a predictable pitch to the magnetic head assembly in the static condition and no pitch bias in the dynamic flying condition.

2. Description of the Prior Art

Magnetic disc storage systems are widely used to provide large volumes of relatively low cost computer-accessible memory or storage. A typical disc storage device has a number or storage. A typical disc storage device has a number of discs coated with a suitable magnetic material mounted for rotation on a common spindle and a set of transducer heads carried in pairs on elongated supports for insertion between adjacent discs, the heads of each pair facing in opposite directions to engage opposite faces of adjacent discs. The support structure is coupled to a positioner motor, the positioner motor typically including a coil mounted within a magnetic field for linear movement and oriented relative to the discs to move the heads radially over the disc surfaces to thereby enable the heads to be positioned over any annular track on the surfaces. In normal operation, the positioner motor, in response to control signals from the computer, positions the transducer heads radially for recording data signals on or retrieving data signals from a preselected one of a set of concentric recording tracks on the discs.

As the density at which digital information is recorded on a magnetic recording surface is increased, the gap between the recording head and the magnetic recording surface must be decreased. The smaller the gap and the closer the magnetic head is positioned with respect to the recording surface, the more difficult it becomes to control the mechanical tolerances of the structure mounting the recording head. To overcome these mechanical difficulties, magnetic recording heads are placed in head assemblies adapted for floating on a thin film of air created by the laminar air flow due to the rotation of the recording surface. Modern magnetic disc drives incorporate rigid substrate discs, the surfaces of which are polished to a high finish so that the head can reliably fly on the air bearing. Systems are presently being designed wherein the heads fly above the disc recording surfaces at heights of less than 20 microinches.

In such systems, when the recording medium rotates, the laminar air flow causes the head assembly to be forced away from the medium. Therefore, some urging means, such as a spring, must be provided to overcome this air flow and counterbalance the head assembly, keeping it as close to the recording medium as possible. Furthermore, floating magnetic recording head assemblies are often mounted in gimbal mounting devices in order to allow the angle and position of the magnetic recording head assembly to conform to the air bearing. The above is well known to those skilled in the art.

One known and popular magnetic head/arm assembly is the IBM type 3370 which is disclosed and claimed in U.S. Pat. No. 4,167,765 to Robert B. Watross. According to the IBM design, a magnetic head/arm assembly has a suspension for an air bearing head slider that includes a single piece, substantially rectangular flexure with two parallel, flexible, narrow fingers, a relatively stiff cross leg, and a central finger to which the slider is attached. A combined load beam/spring element is formed from a single piece and is fastened to the flexure so as to engage a load protuberance formed with the central finger. The substantially triangular load beam/spring element has flanges formed along a portion of its length to concentrate the resilient spring action at the opposite end of the element while providing a stiffening action along the remaining portion of its length. The opposite end is connected to a rigid arm section.

The IBM design, as shown in the Watross patent, is not loadable, i.e. it includes no means for removing the head slider from the disc. Since this is often undesirable, the IBM design has been modified by adding a central protrusion which extends downwardly from the bottom thereof and which is activated by a fixed cam which spans the whole structure. This permits the magnetic head assembly to be lifted off of the recording surface upon retraction of the arm assembly.

While the IBM type 3370 head assembly is quite popular, several problems are associated with the loadable version thereof. The first is that retraction of the slider is limited in its motion. That is, the fixed cam extends below the load beam, in position to be contacted by the central protrusion which extends downwardly from the bottom thereof. As the load beam is retracted, the central protrusion passes the cam and if the load beam were continued to be retracted, the head slider would contact the fixed cam. Even by placing the central protrusion and the fixed cam as close to the rear of the load beam as possible, retraction of the slider is still significantly limited. As a result, it often occurs that discs strike the head slider upon being inserted into a system, causing damage to the slider. This problem results from an inability to fully retract the head slider.

A second problem is a poor ratio of lift point to load beam bending point, resulting in poor load zone tolerances on the disc. That is, becuase of the necessity of putting the central protrusion quite close to the rear end of the load beam, slight misalignments of the load beam bending point and the fixed cam result in significant movements of the head slider. The result is that a large load zone area on the disc is required and this is undesirable since data is typically not recorded in the loading zone.

A still further problem results from the inability to acceptably control the pitch of the head assembly and to separate the functions during dynamic and static conditions. That is, the loadable version of the IBM design strictly provides for loading and unloading so that the pitch of the head assembly must be controlled separately.

One technique for controlling the pitch of a head assembly and separating the functions during dynamic and static conditions is disclosed in U.S. Pat. No. 4,376,294, entitled Head Loading and Retraction Apparatus for Magnetic Disc Storage Systems, and assigned to DMA Systems Corporation, the assignee of the present invention. However, the head loading and retraction apparatus disclosed in such patent is not feasible for use with the IBM type 3370 magnetic head/arm assembly.

SUMMARY OF THE INVENTION

According to the present invention, there is provided an apparatus for loading and unloading a magnetic head assembly on a magnetic recording surface which permits separation of function between load/retract and flying and which produces a predictable pitch to the magnetic head assembly in the static condition and no pitch bias in the dynamic flying condition. More specifically, the present invention relates to an improvement to an IBM type 3370 magnetic head/arm assembly which permits the above. The present invention improves on the IBM type 3370 by adding to the single piece spring/load beam element a pair of wings which extend laterally on each side thereof and a pair of stationary cam members positioned on opposite sides of the element. Each cam member includes a cam surface positioned to be engaged by the wings when the element is retracted. The cams are positioned asymmetrically so as to provide a static pitch by imparting torque to the element through the wings. On the other hand, the static pitch will disappear when the head is loaded and flying. The arrangement of the torque wings and cams permits unrestricted retraction of the slider. Cam asymmetry may be adjusted to compensate for normal manufacturing tolerance requirements in the head/load beam subassembly and to provide a positive load/unloading pitch, without applying presets to the head flexure. The wings may be placed forward, toward the head, resulting in a more favorable ratio of lift point to the load beam bending point and more control of load zone accuracy which will make more of the disc surface available for recording.

Briefly, the present apparatus for supporting a magnetic head assembly adjacent a recording surface for transcribing thereon comprises a rigid arm section, a single piece spring/load beam element joined to the arm section, the element being substantially resilient adjacent the rigid arm section and substantially rigid for its remaining length to present a loading force at its free end, a magnetic head assembly fastened to the element adjacent to the free end, a pair of wings extending laterally on either side of the element, a pair of stationary cam members positioned on opposite sides of the element, each including a cam surface positioned to be engaged by the wings when the element is retracted by the rigid arm section, the cam members being arranged so that a positive attitude pitch rotation is induced in the magnetic head assembly when the element is retracted. According to the preferred embodiment of the invention, the cam surfaces are parallel and longitudinally offset whereby one of the wings contacts one of the cam surfaces before the other of the wings contacts the other of the cam surfaces to induce such positive attitude pitch rotation in the magnetic head assembly.

OBJECTS, FEATURES AND ADVANTAGES

It is therefore the object of the present invention to solve the problems encountered heretofore with the IBM type 3370 magnetic head/arm assembly. It is a feature of the present invention to solve these problems by providing a loading and retraction apparatus for such an assembly which permits separation of function between load/retract and flying. An advantage to be derived is a predictable pitch to the magnetic head assembly in the static condition. A further advantage is no pitch bias in the dynamic flying condition. Still another advantage is unrestricted retraction of the slider. Another advantage is that adjustments are permitted to compensate for normal manufacturing tolerance requirements in the head/load beam subassembly. Still another advantage is a more favorable ratio of lift point to load beam bending point.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

BRIEF DESCRIPTION OF THE DRAWINGS

FIG. 1 is a perspective view of a magnetic disc storage system showing the magnetic head assembly and supporting apparatus in operative position relative to a recording media;

FIG. 2 is an enlarged top plan view thereof;

FIG. 3 is a perspective view of the magnetic head assembly and single piece spring/load beam element.

DESCRIPTION OF THE PREFERRED EMBODIMENT

Figure 4:
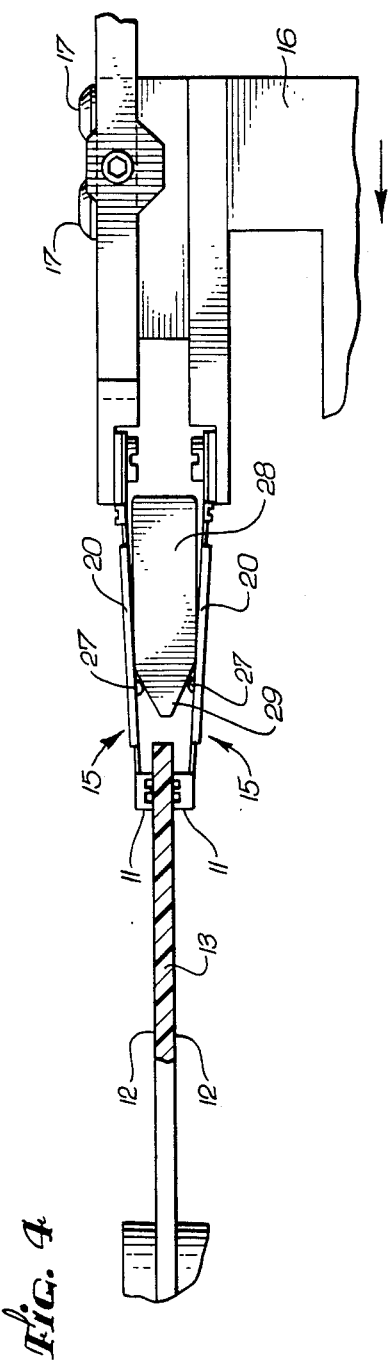
FIGS. 4 and 5 are enlarged sectional views taken along the lines 4—4 and 5—5, respectively, in FIG. 2.

Referring now to the drawings, there is shown an improved apparatus, generally designated 10, for supporting a plurality of magnetic head assemblies 11 adjacent recording surfaces 12 for transcribing thereon. Recording surfaces 12 are on oppostite sides of a disc 13 which typically has a magnetic material coated on both sides thereof to enable data to be magnetically recorded thereon. Disc 13 would be mounted on a spindle (not shown) which is driven by a spindle motor (not shown) which rotates disc 13 about an axis defined by the spindle. In the embodiment of the invention shown in the drawings, disc 13 has recording surfaces 12 on opposite sides therof and a pair of magnetic head assemblies 11 and associated supporting apparatus is shown. However, since the structure on both sides of disc 13 is identical, an explanation of the structure and operation of the apparatus on one side will suffice to describe the structure and operation of the apparatus on the other side thereof.

Data is recorded on disc surfaces 12 by signals applied to transducer elements (not shown) mounted within head assemblies 11. Head assemblies 11 are mounted to the free ends of a pair of cantilevered spring/load beam elements 15. As shown in FIG. 1, multiple elements/head assemblies can be mounted in facing relationship to transcribe data on the opposite surfaces 12 of discs 13, all of elements 15 being connected to a common carriage or rigid arm section 16. Rigid arm section 16 is typically physically coupled to a positioner coil (not shown) of a linear positioner motor or stepping motore (not shown) which, in response to the application of positioning signals thereto, is capable of linearly moving head assemblies 11 over surfaces 12. This permits head assemblies 11 to be selectively positioned over any one of a plurality of annular recording tracks defined on disc recording surfaces 12.

In normal operation, that is, when head assemblies 11 are writing data onto or reading data from surfaces 12 of disc 13, the heads will be loaded. When a head is loaded, it simply means that a spring force is acting upon the head to urge head assembly 11 toward surface 12 of disc 13. This force is counteracted by an air cushion caused by the rapid rotation of disc 13 so that head assemblies 11 actually fly immediately above surfaces 12. In magnetic disc drives, head assemblies 11 may fly at distances of less than 20 microinches above surfaces 12.

The present invention is an improvement to the IBM type 3370 magnetic head/arm assembly which is disclosed and claimed in U.S. Pat. No. 4,167,765, reference to which should be had for a more complete understanding thereof. For the purposes of the present invention, the preferred embodiment of a magnetic head/arm assembly includes suspension element 15 which is made of stainless steel, for example, and is attached by screws 17 to rigid arm section 16, which may be made of aluminum.

Suspension element 15 provides a resilient spring section 18 and a triangular-shaped load beam section 19. Load beam section 19 of element 15 is provided with flanges 20 as a flat load beam flexure. The apex 21 of section 19 applies the load beam force used for loading the air bearing magnetic assembly to disc 13. Magnetic head assembly 11 is fastened to element 15 at its load beam section 19, as described more fully in said U.S. Pat. No. 4,167,765.

As described more fully in said patent, the apex 21 of element 15 contacts a load protuberance on head assembly 11 to apply a loading force to hold the transducer in operating position clos to disc 13. The load beam section 19, which is the triangular portion of element 15 with the turned upside flanges 20 transmits the load force to urge head assembly 11 towards disc 13 and also transmits this force to the center of gravity of head assembly 11.

The advantages of element 15 is that a lesser number of parts are required. No separate rigid load beam is required to stiffen resilient spring section 18. The rigidness required for the load beam section 19 is included in assembly 10 by the turned-up side flanges 20 of the triangular load beam section 19. Resilient section 18 of element 15 serves as a flexible support for magnetic head assembly 11 while load beam section 19 provides a rigid section as a load beam.

According to the present invention, a bent sheet metal part 25 is fastened, preferably by weld points 26, to load beam section 19 of element 15 so as to form a pair of struts or wings 27 which extend laterally on either side of element 15. As shown most clearly in FIG. 2, part 25 is placed close to apex 21 of load beam section 19.

Figure 5:
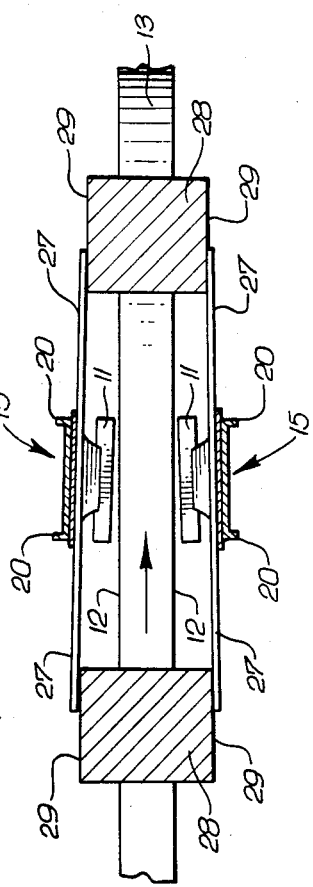

A pair of stationary cam members 28 are positioned on opposite sides of element 15, each cam member 28 including a cam surface 29 which is positioned to be engaged by one of wings 27 when element 15 is retracted by rigid arm section 16. As shown most clearly in FIGS. 1, 4 and 5, cam members 28 actually have opposed cam surfaces 29 which are engaged by the wings 27 connected to the upper and lower elements 15.

It should be immediately apparent from an examinatin of FIGS. 1, 2 4 and 5, that upon retraction of elements 15 by rigid arm section 16, wings 27 will engage cam surfaces 29 to cause retraction of head assemblies 11 from surfaces 12 of disc 13. According to the preferred embodiment of the invention, cam members 28 are arranged so that a positive attitude pitch rotation is induced in magnetic head assemblies 11 when elements 15 are retracted. Also according to the preferred embodiment of the invention, this is achieved by providing identical cam members 28 which are longitudinally offset by a distance X (see FIG. 2) whereby one of wings 27 contacts one of cam surfaces 29 before the other of wings 27 contacts the other of cam surfaces 29. This achieves the desired positive attitude pitch rotation since only one side of head assembly 11 is retracted initially and retraction of this side continues for a short distance before the other side is retracted. This is clearly shown in FIG. 5. A similar effect may be obtained by using cams of different thickness.

Furthermore, the arrangement of cam members 28 makes it simple to adjust for cam asymmetry to compensate for normal manufacturng tolerance requirements in the head/load beam subassembly and to provide a positive load/unloading pitch without applying presets to the head flexure.

It can therefore be seen that according to the present invention, there is provided an apparatus for loading and unloading a magnetic head assembly on a magnetic recording surface which permits separation of function between load/retract and flying and which produces a predictable pitch to the magnetic head assembly in the static condition and no pitch bias in the dynamic flying condition. The present invention improves on the IBM type 3370 by adding to the single piece spring/load beam element a pair of wings 27 which extend laterally on each side thereof and a pair of stationary cam members 28 positioned on opposite sides of the element. Each cam member 28 includes a cam surface 29 positioned to be engaged by wings 27 when element 15 is retracted. Cams 28 are positioned asymmetrically so as to provide a static pitch by imparting torque to element 15 through wings 27. On the other hand, the static pitch will disappear when the head is loaded and flying.

It should be particularly noted that the arrangement of torque wings 27 and cams 28 permits unrestricted retraction of the slider. This prevents damage to be head slider when discs are inserted into a system. Cam asymmetry may be adjusted to compensate for normal manufacturing tolerance requirements in the head/load beam subassembly and to provide a position load/unloading pitch, without allowing presets to the head flexure. Wings 27 may be placed forward, toward the head, resulting in a more favorable ratio of lift point to load beam bending point and more control of load zone accuracy which will make more of the disc surface available for recording.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. Apparatus for supporting a magnetic head assembly adjacent a recording surface for transcribing thereon, comprising:

a rigid arm section;

a spring/load beam element joined to said arm section, said beam element being substantially resilient adjacent to said rigid arm section and substantially rigid for its remaining length to present a loading force at its free end;

a magnetic head assembly fastened to said beam element adjacent to said free end;

a pair of lateral members extending laterally on either side of the said beam element; and a pair of stationary cam members positioned on opposite sides of said beam element each including a cam surface positioned to be engaged by said lateral members when said element is retracted by said rigid arm section, wherein said cam members are physically positioned relative to said lateral members so that a positive attitude pitched rotation of said magnetic head assembly is induced in said magnetic head assembly when said lateral members are guided by said cam members during both a loading and an unloading of said magnetic head assembly from said recording surface.

2. Apparatus according to claim 1, wherein said cam surfaces are parallel and wherein one cam surface is longitudinally offset with respect to the other cam surface along the direction of retraction of said beam element whereby one of said lateral members contacts one of said cam surfaces before the other of said lateral members contacts the other of said cam surfaces.

3. Apparatus according to claim 1, wherein said cam surfaces are parallel and wherein one cam surface is vertically offset with respect to the other cam surface along a direction normal to the recording surface whereby one of said lateral members contacts one of said cam surfaces before the other of said lateral members contacts the other of said cam surfaces.

4. An improved cam and lateral member structure for facilitating the unloading and loading of a magnetic head assembly onto a recording surface for transcribing thereon, the apparatus of the type having a rigid arm section, a beam element joined to said arm section, said beam element being substantially resilient adjacent to said rigid arm section and substantially rigid for its remaining length to present a loading force at its free end, a magnetic head assembly fastened to said beam element adjacent to said free end, a pair of lateral members extending laterally on either side of said element, and a cam member positioned on opposite sides of said element, the cam member including a cam surface positioned to be engaged by said lateral members when said beam element is retracted by said rigid arm section, the improvement wherein there are a pair of cam members physically positioned relative to said lateral members so that a positive attitude pitch rotation of said magnetic head assembly is induced, and said lateral members are guided by said cam members, during both an unloading and a loading of said magnetic head assembly onto said recording medium.

* * * * *